United States Patent
Song et al.

(10) Patent No.: US 12,422,248 B2
(45) Date of Patent: Sep. 23, 2025

(54) DEVICE AND METHOD FOR CALIBRATING ELONGATED METALLURGICAL TOOL BASED ON LASER DISTANCE SENSOR

(71) Applicant: BAOSHAN IRON & STEEL CO., LTD., Shanghai (CN)

(72) Inventors: Xitao Song, Shanghai (CN); Ruimin Wu, Shanghai (CN); Zhenhong Wei, Shanghai (CN); Xingdong Gong, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 247 days.

(21) Appl. No.: 18/008,720

(22) PCT Filed: Jun. 23, 2021

(86) PCT No.: PCT/CN2021/101772
§ 371 (c)(1),
(2) Date: Dec. 7, 2022

(87) PCT Pub. No.: WO2021/259313
PCT Pub. Date: Dec. 30, 2021

(65) Prior Publication Data
US 2023/0221109 A1    Jul. 13, 2023

(30) Foreign Application Priority Data
Jun. 23, 2020  (CN) .................. 202010578857.7

(51) Int. Cl.
*G01B 11/02* (2006.01)
*G01B 11/16* (2006.01)
*G01K 15/00* (2006.01)

(52) U.S. Cl.
CPC ............ *G01B 11/026* (2013.01); *G01B 11/16* (2013.01); *G01K 15/005* (2013.01)

(58) Field of Classification Search
CPC ............................ G01B 11/026; B25J 9/1692
See application file for complete search history.

(56) References Cited

U.S. PATENT DOCUMENTS

| | | | |
|---|---|---|---|
| 10,704,887 B1 * | 7/2020 | Beardsworth | G01S 17/87 |
| 2016/0184994 A1 * | 6/2016 | Trompeter | B25J 9/1692 |
| | | | 700/254 |

(Continued)

FOREIGN PATENT DOCUMENTS

| | | |
|---|---|---|
| CN | 101600936 A | 12/2009 |
| CN | 202255308 U | 5/2012 |

(Continued)

OTHER PUBLICATIONS

Tang, Robot Calibration Using a Single Laser Displacement Meter, Mechatronics vol. 3 No. 4, 1993 (Year: 1993).*

(Continued)

*Primary Examiner* — Uzma Alam
*Assistant Examiner* — Justin J Van Cleave
(74) *Attorney, Agent, or Firm* — Lei Fang, Esq.; Smith Tempel Blaha LLC

(57) ABSTRACT

A method for calibrating an elongated metallurgical tool based on a laser distance sensor (6) is provided. In addition, also provided is a device for calibrating an elongated metallurgical tool based on a laser distance sensor (6).

9 Claims, 10 Drawing Sheets

(56) References Cited

U.S. PATENT DOCUMENTS

| | | | |
|---|---|---|---|
| 2019/0009413 A1 | | 1/2019 | Itsukaichi |
| 2019/0022867 A1* | | 1/2019 | Deng ...................... B25J 19/02 |
| 2021/0146601 A1* | | 5/2021 | Cao ................... B23K 26/0643 |

FOREIGN PATENT DOCUMENTS

| | | | | | |
|---|---|---|---|---|---|
| CN | 103348228 A | | 10/2013 | | |
| CN | 103507071 A | | 1/2014 | | |
| CN | 206847594 U | | 1/2018 | | |
| CN | 109990705 A | * | 7/2019 | | |
| CN | 111152216 A | * | 5/2020 | ............ | B25J 9/1692 |
| DE | 19506471 C2 | | 10/1999 | | |
| WO | 2010130420 A1 | | 11/2010 | | |
| WO | WO-2017114415 A1 | * | 7/2017 | ............. | G01B 11/00 |
| WO | 2020052624 A1 | | 3/2020 | | |

OTHER PUBLICATIONS

International Search Report for PCT/CN2021/101772 dated Sep. 26, 2021.
International Written Opinion for PCT/CN2021/101772 dated Sep. 26, 2021.
CN First OA for CN202010578857.7.
Supplemental Search Report for CN202010578857.7.
The extended European search report dated May 2, 2024.
Geo-Ry Tang et al.: "Robot calibration using a single laser displacement meter", Mechatronics, Pergamon Press, Oxford,GBm vol. 3, No. 4, Aug. 1, 1993, pp. 503-516, the whole document.

* cited by examiner

DEVICE AND METHOD FOR CALIBRATING ELONGATED METALLURGICAL TOOL BASED ON LASER DISTANCE SENSOR

CROSS-REFERENCE TO RELATED APPLICATIONS

This application is a 371 U.S. National Phase of PCT International Application No. PCT/CN2021/101772 filed on Jun. 23, 2021, which claims priority to a Chinese Application No. 202010578857.7 filed on Jun. 23, 2020, the contents of both are incorporated by reference herein in their entireties.

TECHNICAL FIELD

The present invention relates to the technical field of steel manufacturing control, and particularly, relates to a device and method for calibrating an elongated metallurgical tool based on a laser distance sensor.

BACKGROUND

In a stage, such as LF, EAF, of an steel smelting process, a tool for measuring a temperature/sampling may generally have a length of 3.0 to 4.5 m and a diameter that is generally not more than 0.2 m, and therefore, it has the characteristic of being obviously elongated. The temperature measurement/sampling tool is fixedly connected to an end of a driving device (a typical driving device is an industrial robot with 6 degrees of freedom, hereinafter referred to as a robot), and can change its position and orientation with the robot. A front end of the temperature measurement/sampling tool is threaded with a standard temperature measurement/sampling gun. A main operation part of the tool during a sleeving process of a probe and a temperature measurement/sampling operation is the standard temperature measurement/sampling gun. Therefore, in order to ensure precision and stability of the temperature measurement/sampling operation of the robot, it is necessary to maintain a precise position and orientation relationship between the standard temperature measurement/sampling gun and an end flange plate of the robot.

Due to factors such as a manufacturing error, an assembling error, self-deflection and long-termly subjecting to an external force during use, the temperature measurement/sampling tool has a certain difference from its design model. Since a threaded connection results in that it is difficult for an axis of the standard temperature measurement/sampling gun and an axis of a temperature measurement/sampling tool body to be truly coaxial, and a space limitation is caused by a feature of large scale of the temperature measurement/sampling tool, such an elongated tool is not suitable for calibrating its tool coordinate system with a tool coordinate system calibrating method of the robot itself. Therefore, it is necessary to design an external device to assist the temperature measurement/sampling tool in calibrating the coordinate system.

In addition, the standard temperature measurement/sampling gun is prone to deform to a certain extent after multiple operations. Therefore, it is necessary to design an external device. If a deformation value of the standard temperature measurement/sampling gun, which is measured by the external device, is close to or exceeds an allowable value, it will be prompted to replace the standard temperature measurement/sampling gun, to ensure the precision and stability of robot system operations.

SUMMARY

In view of this, the present invention provides a device and method for calibrating an elongated metallurgical tool based on a laser distance sensor, which calibrates a tool coordinate system of a temperature measurement/sampling tool by using the laser distance sensor externally installed, and detects a deformation of a standard temperature measurement/sampling gun.

In order to achieve the above purpose, the present invention adopts the following technical solution: a method for calibrating an elongated metallurgical tool based on a laser distance sensor includes the following steps:

step 1: driving a temperature measurement/sampling tool by a robot so that a standard temperature measurement/sampling gun enters a calibration area;

step 2: reciprocating the standard temperature measurement/sampling gun in a Z direction of a fixed reference coordinate system in the vicinity of the laser distance sensor, so as to seek out a point $P1(X_{P1}, Y_{P1}, Z_{P1})$;

step 3: feeding the standard temperature measurement/sampling gun with a movement distance d in a +Y direction of the fixed reference coordinate system;

step 4: reciprocating the standard temperature measurement/sampling gun in the Z direction of the fixed reference coordinate system in the vicinity of the laser distance sensor, so as to seek out a point $P2(X_{P2}, Y_{P2}, Z_{P2})$;

step 5: a vector P2P1 obtained through the above step 2 and step 4 being a part of a certain generatrix of the standard temperature measurement/sampling gun, wherein the vector P2P1 is expressed as $P=(X_{P1}-X_{P2}, Y_{P1}-Y_{P2}, Z_{P1}-Z_{P2})$, and a standard axis vector A is expressed as $A=(0, |P2P1|, 0)$, wherein: $X_{P1}-X_{P2}=LD_{P1}-LD_{P2}$, $LD_{P1}$ and $LD_{P2}$ are values measured by the laser distance sensor at the point P1 and the point P2, respectively, $Y_{P1}-Y_{P2}=d$, d is a distance value of the standard temperature measurement/sampling gun fed in the +Y direction of the fixed reference coordinate system when a calibrating device is one laser distance sensor, or is a distance value in a Y direction between lasers of two laser distance sensors arranged in a staggered manner; $Z_{P1}-Z_{P2}$ is obtained from a difference between Z coordinates of two demonstration points of the robot;

step 6: adjusting, according to the computed result of the standard axis vector A obtained in step 5, a position and orientation of the temperature measurement/sampling tool so that an axis of the standard temperature measurement/sampling gun is parallel to the above standard axis vector A;

step 7: moving the standard temperature measurement/sampling gun in a −Y direction of the fixed reference coordinate system to seek out an end central TCP point of the temperature measurement/sampling tool (i.e., a tool coordinate system origin o, which will not be distinguished from the TCP point hereafter); and after the TCP point is obtained, determining a corresponding tool coordinate system of the temperature measurement/sampling tool according to the TCP point and relevant parameter values of the standard axis vector A, which is denoted as o-xyz.

Further, there are two methods to seek out the point P1 in step 2 or the point P2 in step 4:

seeking out positions with minimum values measured by the laser distance sensor within a scanning range, which are denoted as P1 and P2; and seeking out upper and lower edges of a section of the standard temperature measurement/sampling gun within the scanning range and obtaining coordinates of P1 and P2 by computation.

Preferably, when the movement distance d in step 3 is a distance in the Y direction between lasers of two laser distance sensors arranged in a typical side-by-side, side-by-side staggered or orthogonally staggered manner, the standard temperature measurement/sampling gun does not need to be fed with the movement distance d in the +Y direction of the fixed reference coordinate system, and P1 and P2 can be sought out, respectively, by only one reciprocating motion of the standard temperature measurement/sampling gun in the Z direction, that is, the steps 2 and 4 are executed equivalently.

Preferably, in step 5, the obtained vector P2P1 is denoted as $P=(p_1,p_2,p_3)$, and the standard axis vector is denoted as $A=(a_1,a_2,a_3)$. Then, P is rotated around a rotation axis R by a rotation angle $\varphi$ to obtain A, wherein the rotation angle $\varphi$ is:

$$\varphi = \arccos\left(\frac{P \cdot A}{|P||A|}\right).$$

the rotation axis R is:

$$R = \begin{pmatrix} p_2 a_3 - p_3 a_2 \\ p_3 a_1 - p_1 a_3 \\ p_1 a_2 - p_2 a_1 \end{pmatrix}.$$

a unit vector $R_0$ corresponding to the rotation axis R is:

$$R_0 = \begin{pmatrix} r_1 \\ r_2 \\ r_3 \end{pmatrix}.$$

a rotation matrix T of the vector P rotating to the standard axis vector A is obtained by the Rodrigues' rotation formula as follows:

$$T = \begin{bmatrix} \cos\varphi + r_1^2(1-\cos\varphi) & r_1 r_2(1-\cos\varphi) - r_3\sin\varphi & r_2\sin\varphi + r_1 r_3(1-\cos\varphi) \\ r_3\sin\varphi + r_1 r_2(1-\cos\varphi) & \cos\varphi + r_2^2(1-\cos\varphi) & -r_1\sin\varphi + r_2 r_3(1-\cos\varphi) \\ -r_2\sin\varphi + r_1 r_3(1-\cos\varphi) & r_1\sin\varphi + r_2 r_3(1-\cos\varphi) & \cos\varphi + r_3^2(1-\cos\varphi) \end{bmatrix}.$$

according to a chosen order of Euler angles, corresponding Euler angles are obtained to realize positioning of the axis.

Preferably, in step 5, at least one redundant point P3 is added for verifying the results of scanning so as to determine the vector P2P1.

Preferably, in step 7, in a process of the temperature measurement/sampling tool moving to seek out the TCP point, the values measured and collected by the laser distance sensors are used for detection of reliability of an axial calibration result and deformation of the standard temperature measurement/sampling gun.

The present invention further provides a device for calibrating an elongated metallurgical tool based on a laser distance sensor, including a plurality of typical laser distance sensors and installation parts outside the laser distance sensors, specifically a robot, a plurality of temperature measurement/sampling tools provided on an end flange plate of the robot, temperature measurement/sampling guns connected to the temperature measurement/sampling tools, one or more laser distance sensors and calibrating devices located outside the laser distance sensors, and the like.

Preferably, the number of the typical laser distance sensors is 1 to 2. The typical laser distance sensor has a digital quantity/analog quantity detection function. A detection range of the digital quantity/analog quantity of the typical laser distance sensor is determined according to space scales of the temperature measurement/sampling tools and on-site space scale.

Preferably, a profile of the typical laser distance sensor is marked, wherein three surfaces are labeled as surface D, surface E and surface F, and three surfaces opposite to the three surface are labeled as surface D−1, surface E−1 and surface F−1 respectively, wherein the surface F is an emitting/receiving surface of a laser; and typical arrangement manners of the typical laser distance sensors include an installation of a single sensor, a typical side-by-side installation of two sensors, a side-by-side staggered installation of two sensors, a typical orthogonal installation of two sensors, an orthogonal staggered installation of two sensors and the like.

After adopting the above technical solutions, the present invention has the following advantages.

1. The present invention provides a device and a method for calibrating the elongated metallurgical tool based on the laser distance sensor. By means of identifying and calibrating the vector on one generatrix of the standard temperature measurement/sampling gun and the end TCP point based on the calibrating device outside the laser distance sensor, it is possible to acquire a precise position and orientation relationship between the standard temperature measurement/sampling gun and the end flange plate of the robot, and the precise tool coordinate system, which has good scientific performance and high precision.

2. In the technical solutions of the present invention, the deformation of the standard temperature measurement/sampling gun after multiple operations can be detected in the process of calibrating the standard temperature measurement/sampling gun based on the calibrating device outside the laser distance sensor. When the measured deformation value of the standard temperature measurement/sampling gun is close to or exceeds the allowable value, an accurately and timely reminder of replacement of the standard temperature measurement/sampling gun to ensure the precision and stability of the temperature measurement/sampling system operations of the robot can thus be acquired.

BRIEF DESCRIPTION OF THE DRAWINGS

Other features, objectives and advantages of the present invention will become more apparent by reading the detailed description of non-limiting examples with reference to the following drawings.

REFERENCE SIGNS

Figure 1:
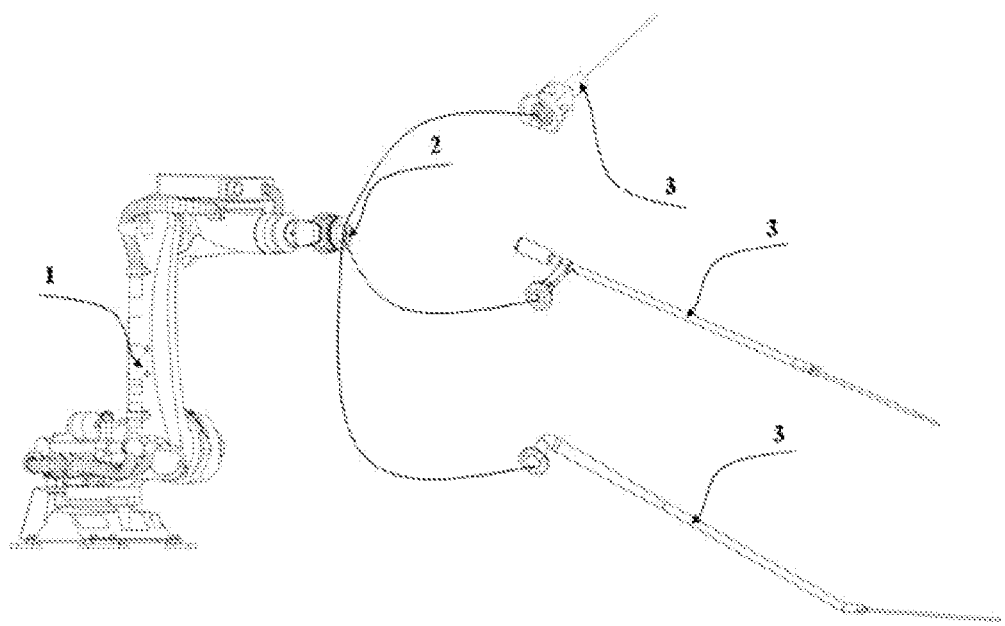
FIG. 1 is a structural schematic view of an industrial robot and a temperature measurement/sampling tool in the prior art.
Figure 2:
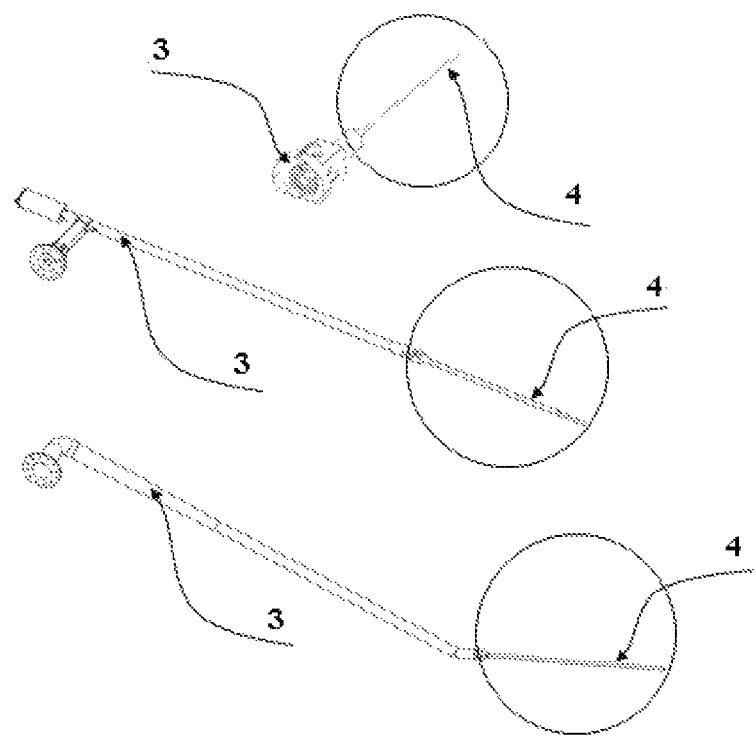
FIG. 2 is a schematic view of the standard temperature measurement/sampling gun installed at a front end of a temperature measurement/sampling tool in the prior art.
Figure 3:
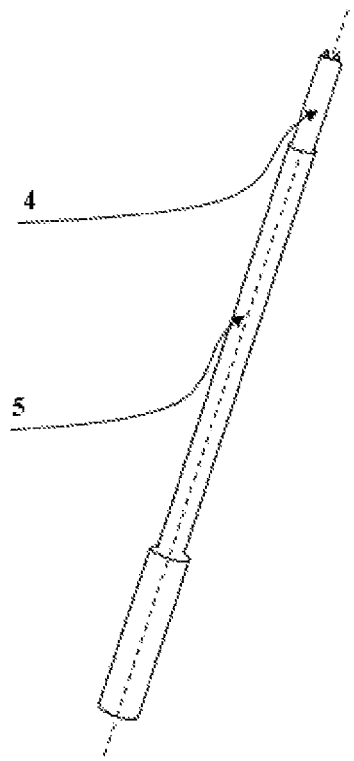
FIG. 3 is a schematic view of the standard temperature measurement/sampling gun sleeved with a probe in the prior art.

1. Robot (6 degrees of freedom);
2. End flange plate of the robot;
3. Temperature measurement/sampling tool;
4. Standard temperature measurement/sampling gun;
5. Probe;
6. Laser distance sensor;
7. Calibrating device;
8. Tool coordinate system;
9. Fixed reference coordinate system;
10. Calibration area; and
11. Laser.

DETAILED DESCRIPTION

The technical solutions of the present invention are described in details below in conjunction with the drawings of the description.

The detailed features and advantages of the present invention are described in details in the examples below, the contents of which are sufficient to enable those skilled in the art to understand the technical contents of the present invention and carry out the invention accordingly. According to the description, claims and drawings disclosed in the specification, those skilled in the art can easily understand the related objectives and advantages of the present invention.

A "world coordinate system" of a robot is a virtual fixed reference coordinate system fixedly connected onto a robot base. Each robot has a fixed "world coordinate system" after being manufactured. Other coordinate systems set by users, including a "workpiece coordinate system" and a "tool coordinate system", are each a fixed reference coordinate system or a follow-up coordinate system transformed based on the "world coordinate system". The "tool coordinate system" calibrated herein belongs to the follow-up coordinate system.

Example 1

As shown in FIGS. 1 to 4, in the prior art, a temperature measurement/sampling tool 3 is generally installed on an end flange plate 2 of a robot, has the characteristic of being obviously elongated, and can change its position and orientation along with the robot 1. A front end of the temperature measurement/sampling tool 3 is threaded with a standard temperature measurement/sampling gun 4. A main operation part of the tool during a sleeving process of a probe 5 and a temperature measurement/sampling operation is the standard temperature measurement/sampling gun 4. In order to ensure precision and stability of the temperature measurement/sampling operation of the robot, it is necessary to calibrate the position and orientation of the standard temperature measurement/sampling gun 4 relative to the flange plate at the end of the robot. The robot 1 is an industrial robot.

The example provides a device for calibrating an elongated metallurgical tool based on a laser distance sensor, including a typical laser distance sensor 6 and a calibrating device 7 outside the laser distance sensor 6. The number of the typical laser distance sensors 6 is 1 to 2, and the typical laser distance sensor 6 has a digital quantity/analog quantity detection function.

Figure 5:
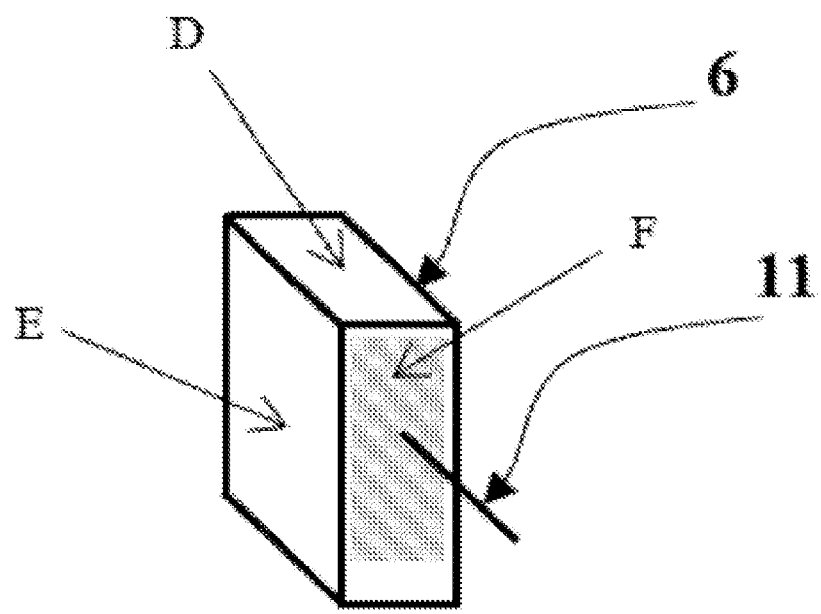
FIG. 5 is a schematic view of a profile of a laser distance sensor provided by an example of the present invention.

As shown in FIG. 5, the profile of the typical laser distance sensor 6 is marked. Three surfaces of the typical laser distance sensor 6 are labeled as surface D, surface E and surface F, respectively, and three surfaces opposite to the three surfaces are labeled as surface D-1, surface E-1 and surface F-1, respectively, wherein the surface F is an emitting/receiving surface of a laser 11. A detection range of a digital quantity/analog quantity of the laser distance sensor 6 on the calibrating device 7 needs to meet measurement requirements. The range needs to be determined according to a space scale of the temperature measurement/sampling tool 3 and an on-site space scale.

Figure 6:
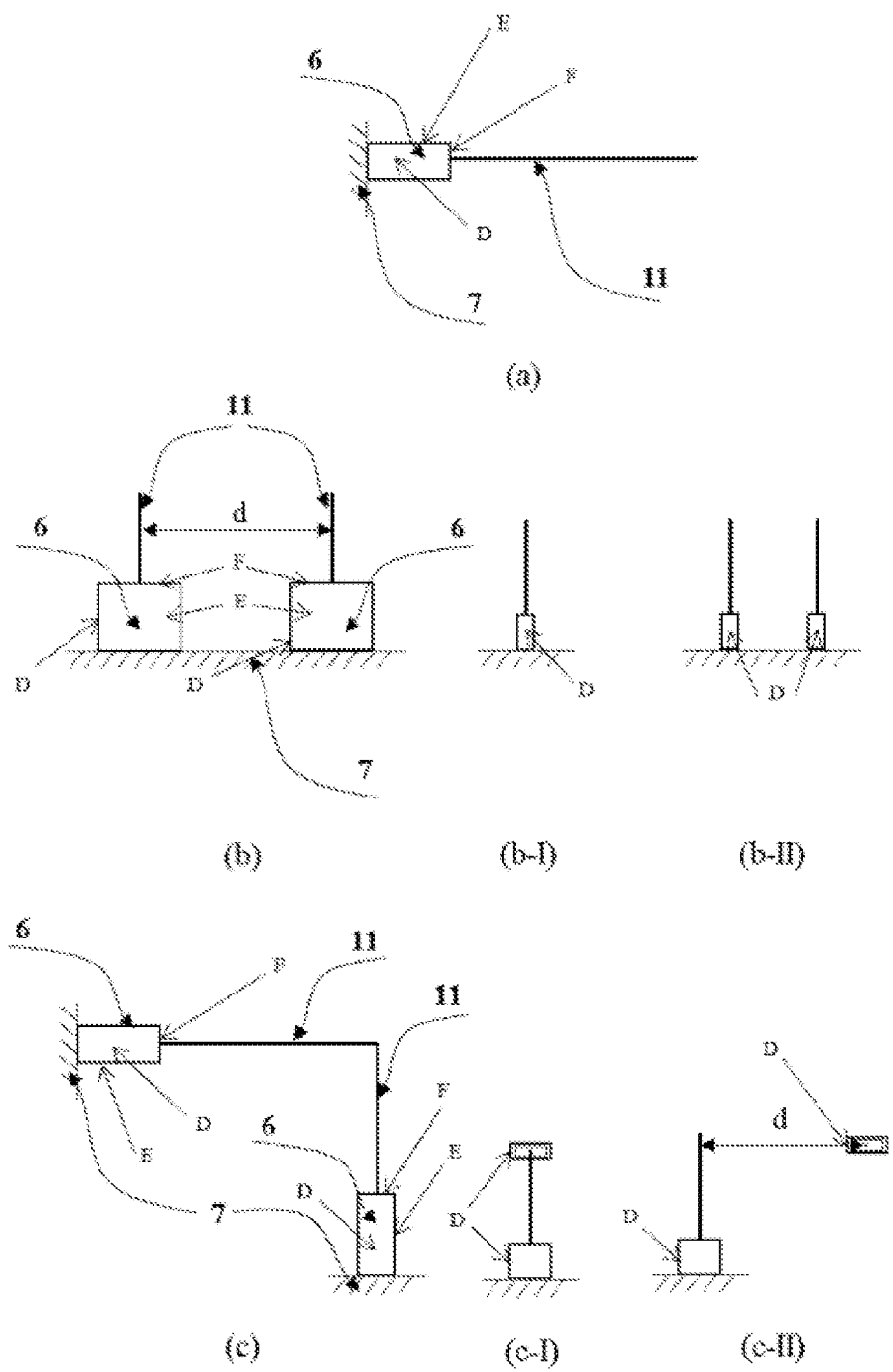
FIG. 6 is a schematic view of an arrangement manner of a calibrating device provided by an example of the present invention, wherein (a) corresponds to a single calibrating device; (b), (b-I) and (b-II) correspond to two calibrating devices arranged side by side, wherein (b-I) shows a typical side-by-side installation, and (b-II) shows side-by-side staggered installation; (c), (c-I) and (c-II) correspond to two calibrating devices arranged orthogonally, wherein (c-I) shows typical orthogonal installation and (c-II) shows orthogonal staggered installation.

As shown in FIG. 6, typical arrangements of the typical laser distance sensor include an installation of a single sensor, a typical side-by-side installation of two sensors, a side-by-side staggered installation of two sensors, a typical orthogonal installation of two sensors, an orthogonal staggered installation of two sensors, and the like. In FIG. 6, (a) one laser distance sensor 6 is included; (b) two laser distance sensors 6 installed side by side are included, and the two laser distance sensors 6 are installed on a same plane, wherein (b-I) shows the typical side-by-side installation of the two sensors, and (b-II) shows the side-by-side staggered installation of the two sensors; (c) two laser distance sensors 6 installed orthogonally are included, and the two laser distance sensors are installed on two planes being mutually perpendicular, respectively, wherein (c-I) shows the typical orthogonal installation of the two sensors, in which lasers 11 can be intersected, and (c-II) shows the orthogonal staggered installation of the two sensors, in which lasers 11 cannot be intersected.

When the typical laser distance sensor 6 is installed, it is easy to obtain a conversion relationship between the emitting/receiving surface (surface F) of the laser 11 of the laser distance sensor 6 and a world coordinate system 9 of the robot 1. A measurement range of the laser distance sensor 6 in this installation manner meets measurement requirements for the temperature measurement/sampling tool 3. A specific installation arrangement manner of the calibrating device 7 is determined in accordance with an on-site environmental condition where the robot 1 is placed.

Figure 4:
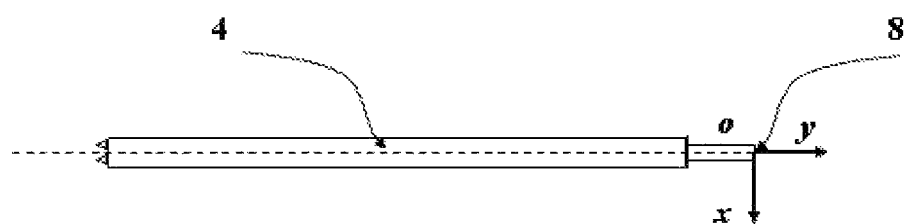
FIG. 4 is a schematic view of a used tool coordinate system provided by an example of the present invention.

Identification and positioning is performed on a vector on a generatrix of the standard temperature measurement/sampling gun 4 by the calibrating device 7 based on the laser distance sensor 6, and according to the positioning result, the orientation of the temperature measurement/sampling tool 3 is adjusted by the robot 1 to a state where the axis of the temperature measurement/sampling tool 3 is parallel to a standard axis. In this state, an end TCP point of the temperature measurement/sampling tool 3 (i.e., an end central point of the tool) is positioned, and a tool coordinate system 8 (as shown in FIG. 4) is obtained according to the obtained data. A coordinate origin o of the obtained typical tool coordinate system 8 is located at the TCP point of the standard temperature measurement/sampling gun 4, where a y-axis coincides with the standard axis. The tool coordinate system 8 is a right-hand coordinate system.

The detailed steps of calibrating the tool coordinate system 8 for the elongated temperature measurement/sampling tool 3 by the external calibrating device 7 based on the laser distance sensor 6 are introduced with reference to the installation method as shown in (a) of FIG. 6.

In this example, the emitting/receiving surface (surface F) of the laser 11 of the laser distance sensor 6 is parallel to an O-YZ plane in the fixed reference coordinate system 9, and the coordinate system is a schematic view of an O-XYZ three-axis direction of the fixed reference coordinate system 9. The fixed reference coordinate system is a fixed three-dimensional Cartesian coordinate system, such as a world coordinate system of a robot or a set workpiece coordinate system of a robot.

Figure 7:
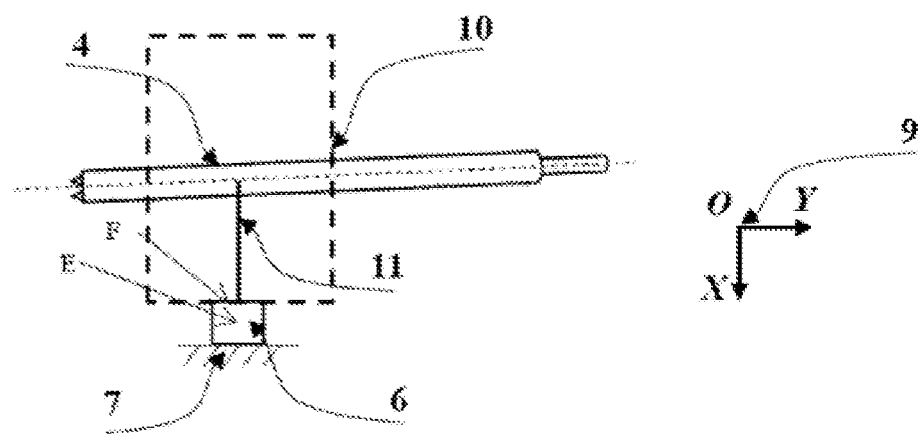
FIG. 7 is a schematic view of a calibration area provided by an example of the present invention.

As shown in FIG. 7, in step 1: the temperature measurement/sampling tool 3 is driven by the robot so that the standard temperature measurement/sampling gun 4 enters a calibration area 10.

Figure 8:
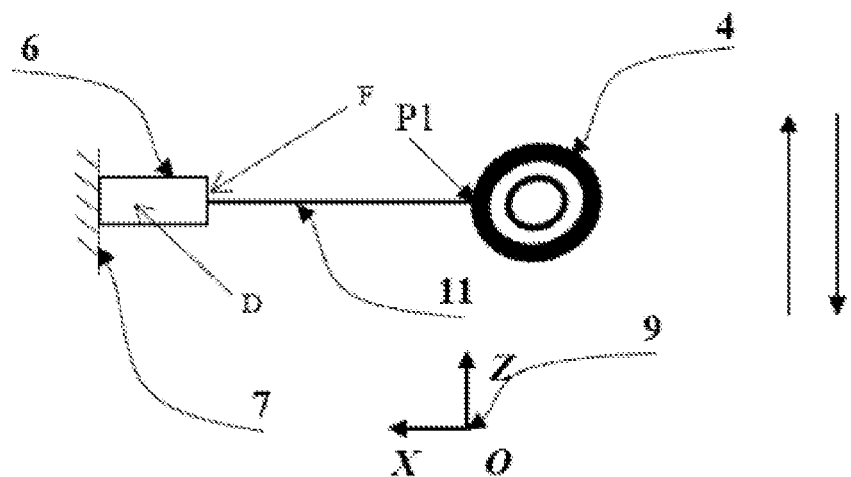
FIG. 8 is a schematic view of seeking out a point P1 by reciprocating motion of the standard temperature measurement/sampling gun (4) in the Z direction of the fixed reference coordinate system provided by an example of the present invention.

As shown in FIG. 8, in step 2: the standard temperature measurement/sampling gun 4 is reciprocated in a Z direction of the fixed reference coordinate system in the vicinity of the laser distance sensor 6, so as to seek out a point P1($X_{P1}$, $Y_{P1}$, $Z_{P1}$).

Figure 9:
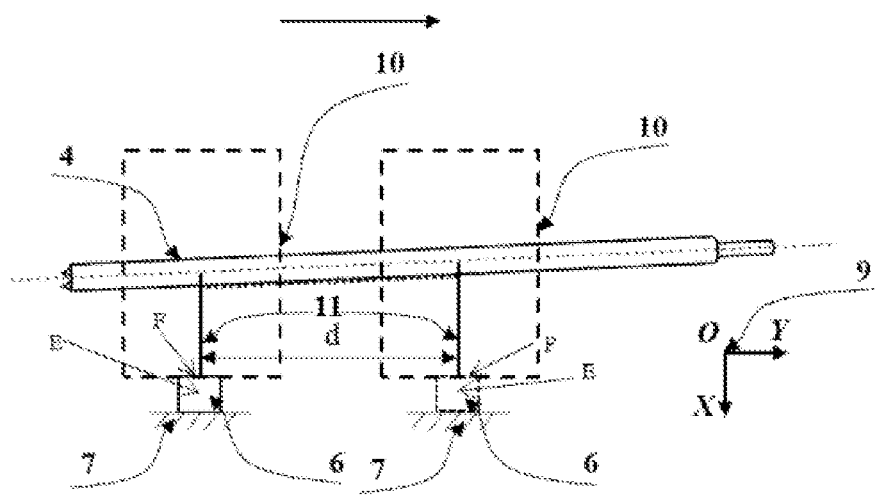
FIG. 9 is a schematic view of the standard temperature measurement/sampling gun (4) which is fed with a movement distance d in a +Y direction of the fixed reference coordinate system provided by an example of the present invention.
Figure 10:
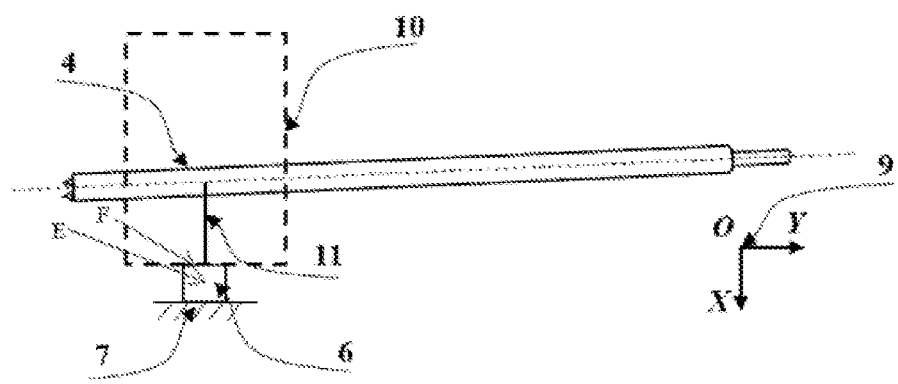
FIG. 10 is a schematic view of the standard temperature measurement/sampling gun (4) moving to a position in the +Y direction of the fixed reference coordinate system provided by an example of the present invention.

As shown in FIGS. 9 and 10, in step 3: the standard temperature measurement/sampling gun 4 is fed with a movement distance d in a +Y direction of the fixed reference coordinate system. Furthermore, when the movement distance d in step 3 is a distance in a Y direction between the lasers 11 of the two laser distance sensors arranged in the typical side-by-side/side-by-side staggered manner, the standard temperature measurement/sampling gun 4 does not need to be fed with the movement distance d in the +Y direction of the fixed reference coordinate system, and P1 and P2 can be sought out, respectively, by only one reciprocating motion of the standard temperature measurement/sampling gun 4 in the Z direction, that is, the step 2 and the step 4 described below are executed equivalently.

Figure 11:
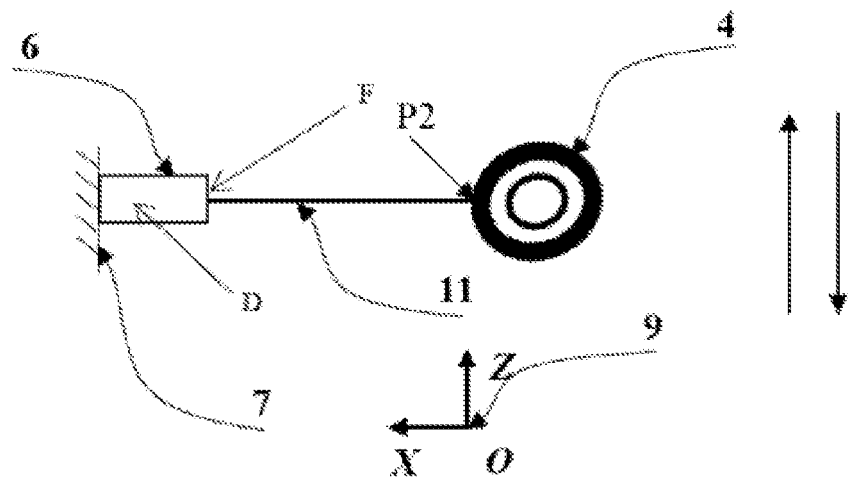
FIG. 11 is a schematic view of the standard temperature measurement/sampling gun (4) moving in the Z direction of the fixed reference coordinate system to seek out a point P2 provided by an example of the present invention.

As shown in FIG. 11, in step 4: the standard temperature measurement/sampling gun 4 is reciprocated in the Z direction in the vicinity of the laser distance sensor 6, to seek out the point P2 ($X_{P2}$, $Y_{P2}$, $Z_{P2}$); wherein, there are two methods to seek out the point P1 in step 2 or the point P2 in step 4:

seeking out positions with the minimum values measured by the laser distance sensor within a scanning range, which are denoted as P1 and P2; and seeking out upper and lower edges of a section of the standard temperature measurement/sampling gun within the scanning range, and obtaining coordinates of P1 and P2 by computation.

Here, in steps 2 and 4, the wording "in the vicinity of the laser distance sensor" refers to a scanning area that is set by multiplication of a diameter or radius value of the gun as a minimum unit in an area in the vicinity of the laser 11 of the laser distance sensor, and in this area, it is necessary to take a corresponding functional relationship between a moving speed and scanning and triggering of the laser 11 into account. It is easily understood that during movement at a uniform speed in the scanning area, the relationship between the moving speed and the scanning and triggering of the laser 11 is simplest and most accurate.

Figure 12:
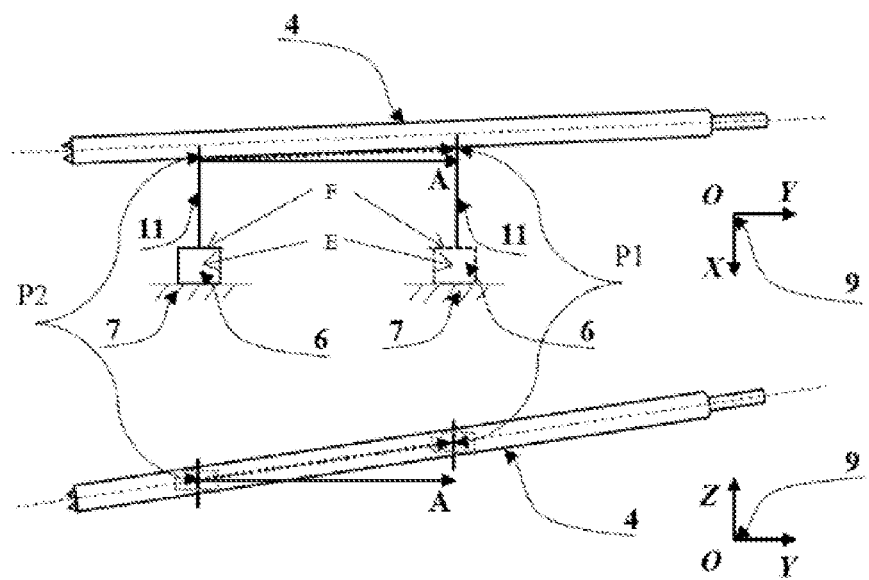
FIG. 12 is a schematic view of measuring a vector P of a generatrix provided by an example of the present invention.

As shown in FIG. 12, in step 5: the obtained vector P is a part of a certain generatrix on the standard temperature measurement/sampling gun 4, and is expressed as $P=(X_{P1}-X_{P2}, Y_{P1}-Y_{P2}, Z_{P1}-Z_{P2})$, wherein $X_{P1}-X_{P2}=LD_{P1}-LD_{P2}$, $LD_{P1}$ and $LD_{P2}$ are values measured by the laser distance sensor 6 at the point P1 and the point P2, respectively; $Y_{P1}-Y_{P2}=d$, d is a distance value of the standard temperature measurement/sampling gun 4 fed in the +Y direction of the fixed reference coordinate system when the calibrating device is one laser distance sensor 6, or a distance value of lasers 11 in the Y direction between lasers 11 of two laser distance sensors 6 arranged in a staggered manner; and $Z_{P1}-Z_{P2}$ is obtained from a difference between the Z coordinates of two demonstration points of the robot. A standard axis vector A is expressed as $A=(0, |P2P1|, 0)$. In the fixed reference coordinate system, the obtained vector P is denoted as: $P=(p_1,p_2,p_3)$, and the standard axis vector is denoted as $A=(a_1,a_2,a_3)$. Then, through conversion of an axial angle, A is obtained by rotating P around a rotation axis R by a rotation angle φ.

The rotation angle φ is:

$$\varphi = \arccos\left(\frac{P \cdot A}{|P||A|}\right).$$

The rotation axis R is:

$$R = \begin{pmatrix} p_2 a_3 - p_3 a_2 \\ p_3 a_1 - p_1 a_3 \\ p_1 a_2 - p_2 a_1 \end{pmatrix}.$$

A unit vector $R_0$ corresponding to the rotation axis R is:

$$R_0 = \begin{pmatrix} r_1 \\ r_2 \\ r_3 \end{pmatrix}.$$

A rotation matrix T of the vector P rotating to the standard axis vector A is obtained by the Rodrigues' rotation formula as follows:

$$T = \begin{bmatrix} \cos\varphi + r_1^2(1-\cos\varphi) & r_1 r_2(1-\cos\varphi) - r_3\sin\varphi & r_2\sin\varphi + r_1 r_3(1-\cos\varphi) \\ r_3\sin\varphi + r_1 r_2(1-\cos\varphi) & \cos\varphi + r_2^2(1-\cos\varphi) & -r_1\sin\varphi + r_2 r_3(1-\cos\varphi) \\ -r_2\sin\varphi + r_1 r_3(1-\cos\varphi) & r_1\sin\varphi + r_2 r_3(1-\cos\varphi) & \cos\varphi + r_3^2(1-\cos\varphi) \end{bmatrix}.$$

According to a chosen order of Euler angles, corresponding Euler angles are obtained to realize positioning of the axis.

Figure 13:
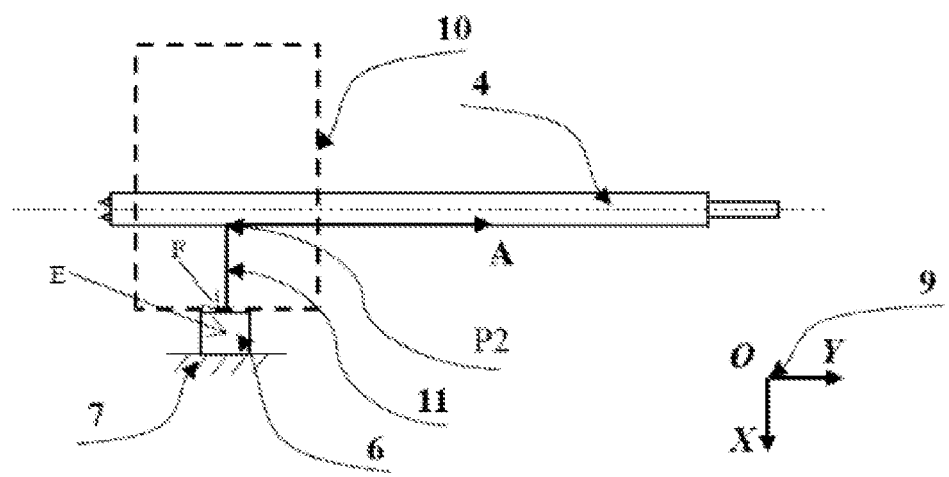
FIG. 13 is a schematic view of adjusting a position and orientation of a tool to a standard axis A provided by an example of the present invention.
Figure 14:
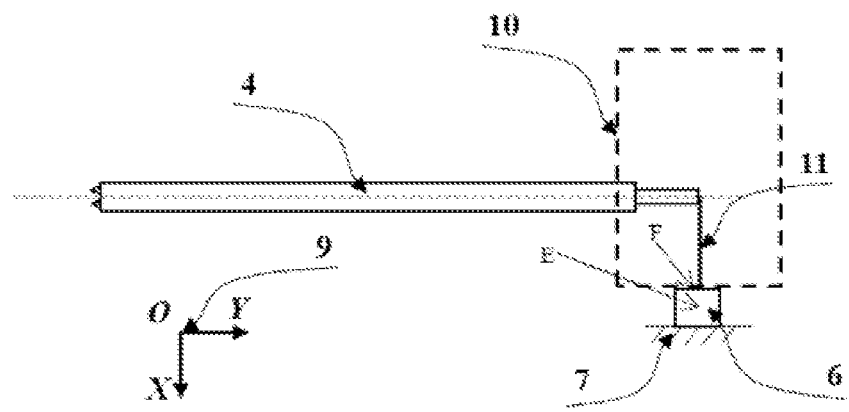
FIG. 14 is a schematic view of seeking out the TCP by reciprocating motion of the standard temperature measurement/sampling gun (4) in the Y direction of the fixed reference coordinate system provided by an example of the present invention.
Figure 15:
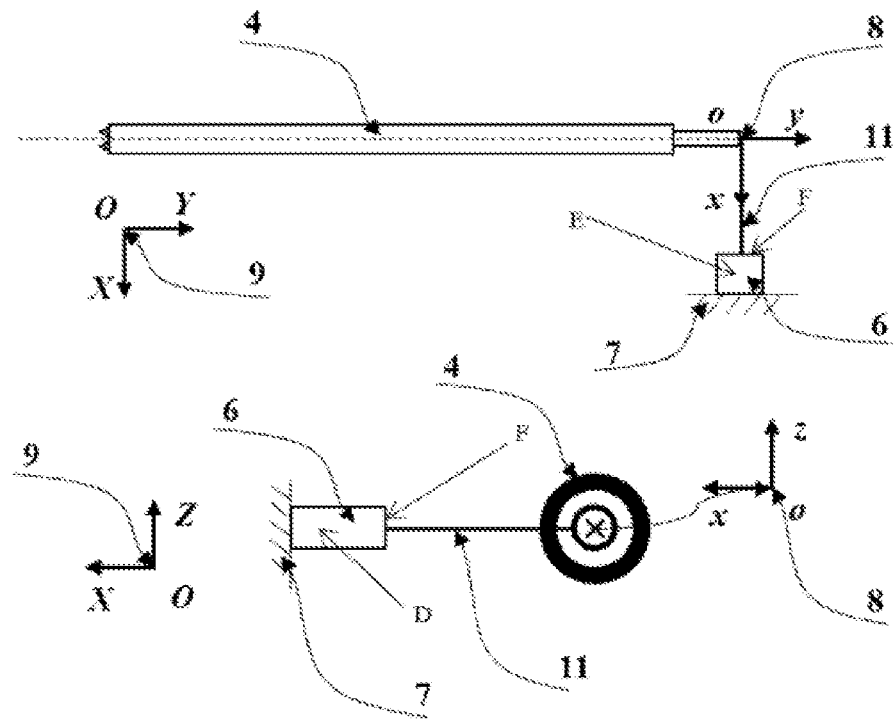
FIG. 15 is a schematic view of a tool coordinate system obtained by calibration provided by an example of the present invention.
Figure 16:
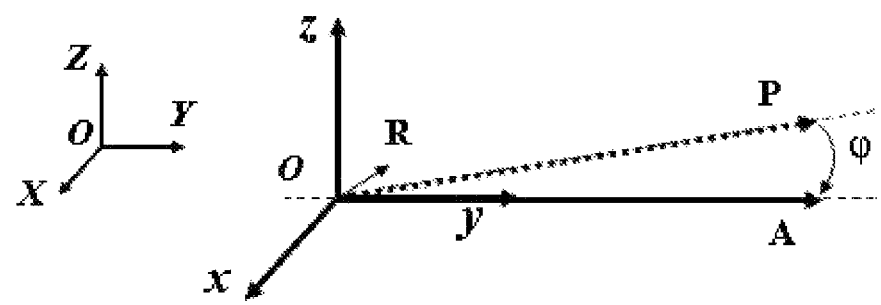
FIG. 16 is a schematic view of a transformation to a standard axis provided by an example of the present invention.

As shown in FIG. 13, in step 6: according to the computed result of the standard axis vector A obtained in step 5, the position and orientation of the temperature measurement/sampling tool is adjusted so that the axis of the standard temperature measurement/sampling gun is parallel to the standard axis vector A;

As shown in FIGS. 14, 15 and 16, in step 7: the standard temperature measurement/sampling gun moves in a −Y direction of the fixed reference coordinate system to seek out the TCP point; and after the TCP point is obtained, a corresponding tool coordinate system of the temperature measurement/sampling tool 3 is obtained, and denoted as o-xyz.

Example 2

Figure 17:
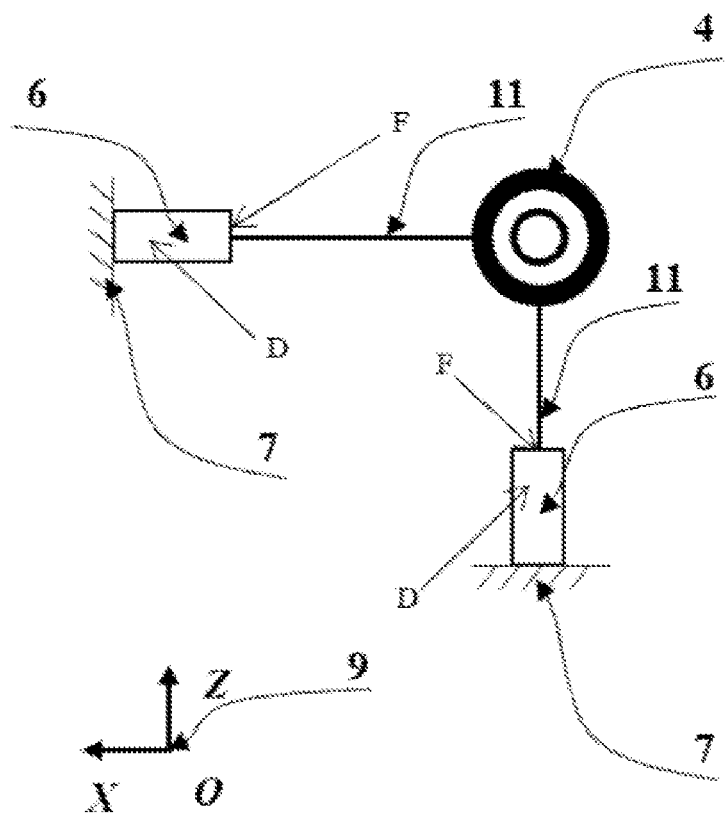
FIG. 17 is a schematic view of a calibration of a verification result and a detection of deformation provided by an example of the present invention.

As shown in FIG. 17, example 2 of the present invention is similar to example 1, except for the following design changes. In the example, there are two laser distance sensors 6 arranged orthogonally, and the calibrating device 7 based on the laser distance sensor 6 assists in calibration of the result verified in a process of the temperature measurement/sampling tool 3 moving to seek out the TCP point. The values measured by the laser distance sensors 6 can be used for detection of reliability of an axial calibration result and deformation of a gun body.

In other examples, in step 5, at least one of redundant point P3, P4, P5 or the like is added for verifying the results of scanning to determine the vector P2P1, which further improves the precision of the calibrating method.

Figure 18:
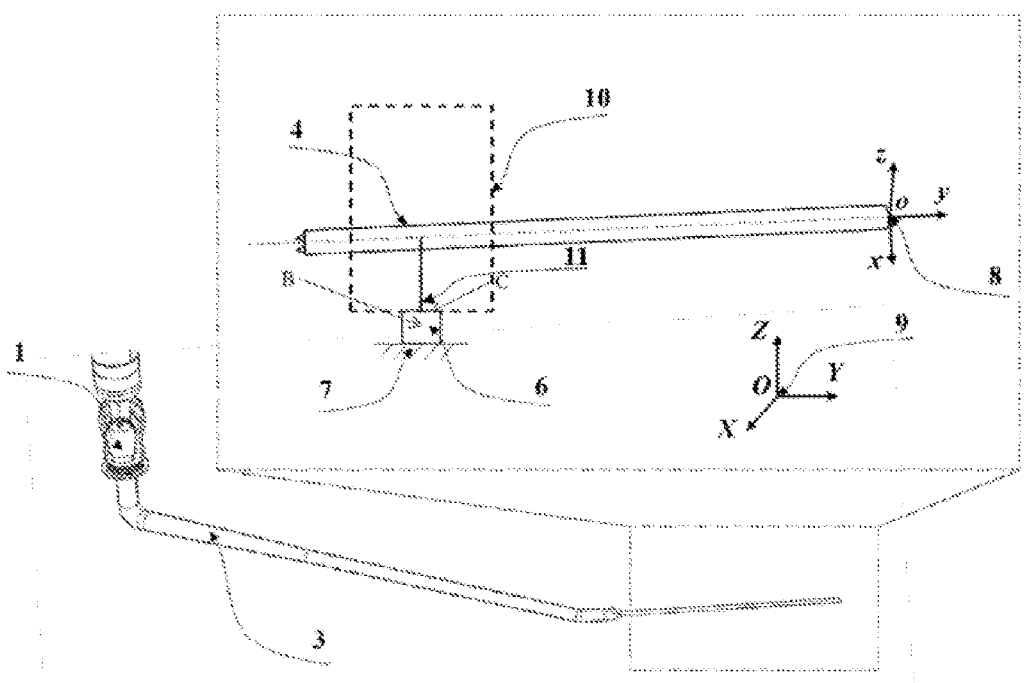
FIG. 18 is a schematic view of the calibration area, the tool coordinate system and the fixed reference coordinate system provided by an example of the present invention.

FIG. 18 is a schematic view of a device involved in a method for calibrating an elongated metallurgical tool based on a laser distance sensor.

Finally, it should be pointed out that although the present invention has been described with reference to the current specific examples, those of ordinary skill in the art should realize that the above examples are only used to illustrate the present invention, and are not intended as limiting the present invention, and various equivalent changes or replacements can be made without departing from the concept of the present invention. Therefore, any changes and modifications made to the above examples within the substantive spirit scope of the present invention will fall within the scope of the claims of the present invention.

What is claimed is:

1. A method for calibrating an elongated metallurgical tool based on at least one laser ranging sensor (6), comprising the following steps:
   step 1: driving a temperature measurement/sampling tool (3) by a robot (1) so that a standard temperature measurement/sampling gun (4) enters a calibration area (10);
   step 2: reciprocating the standard temperature measurement/sampling gun (4) in a Z direction of a fixed reference coordinate system in the vicinity of a laser (11) emitted by at least one laser ranging sensor (6), so as to seek out a point P1($X_{P1}, Y_{P1}, Z_{P1}$);
   step 3: feeding the standard temperature measurement/sampling gun (4) with a movement distance d in a +Y direction of the fixed reference coordinate system;
   step 4: reciprocating the standard temperature measurement/sampling gun (4) in the Z direction of the fixed reference coordinate system in the vicinity of the laser (11) emitted by at least one laser ranging sensor (6), so as to seek out a point P2($X_{P2}, Y_{P2}, Z_{P2}$);
   step 5: a vector P2P1 obtained through the above step 2 and step 4 being a part of a certain generatrix is a vector that falls along or within the standard temperature measurement/sampling gun (4), wherein the vector P2P1 is expressed as P=($X_{P1}-X_{P2}$, $Y_{P1}-Y_{P2}$, $Z_{P1}-Z_{P2}$), and a standard axis vector A is expressed as A=(0, |P2P1|, 0), wherein: $X_{P1}-X_{P2}=LD_{P1}-LD_{P2}$, $LD_{P1}$ and $LD_{P2}$ are values measured by at least one laser ranging sensor (6) at the point P1 and the point P2, respectively, $Y_{P1}-YP2=d$, d is a distance value of the standard temperature measurement/sampling gun (4) fed in the +Y direction of the fixed reference coordinate system when a calibrating device is at least one laser ranging sensor (6), or is a distance value in a Y direction between the laser (11) emitted by each of at least two laser ranging sensors (6) arranged in a staggered manner, $Z_{P1}-Z_{P2}$ is obtained from a difference between Z coordinates of two demonstration points of the robot;
   step 6: adjusting, according to the computed result of the standard axis vector A obtained in step 5, a position and posture of the temperature measurement/sampling tool (3) so that an axis of the standard temperature measurement/sampling gun (4) is parallel to the above standard axis vector A;
   step 7: moving the standard temperature measurement/sampling gun (4) in a −Y direction of the fixed reference coordinate system to seek out an end central point of the temperature measurement/sampling tool, wherein the end central point is a TCP, and determining, according to the TCP, a corresponding tool coordinate system (8) of the temperature measurement/sampling tool (3), which is denoted as o-xyz.

2. The method according to claim 1, wherein P1 and/or P2 is located by one of the following two methods:
   a) Identifying the positions with the minimum distances between the at least one laser ranging sensor and the sampling gun within its laser ranging sensors' scanning ranges, or
   b) Locating upper and lower edges of the gun section within the scanning range and calculating midpoints as P1 and P2 coordinates.

3. The method according to claim 1, wherein, when two laser ranging sensors (6) are arranged side-by-side and/or side-by-side staggered, the movement distance d is a distance in a Y direction between the laser (11) of each of the two laser ranging sensors (6).

4. The method according to claim 1, wherein, in step 5, in the fixed reference coordinate system, the vector P is denoted as: P=($p_1, p_2, p_3$), and the standard axis vector A is denoted as: A=($a_1, a_2, a_3$); A is obtained through conversion of an axial angle, by rotating the vector P around a rotation axis R by a rotation angle φ,
   wherein the rotation angle φ is:

$$\varphi = \arccos\left(\frac{P \cdot A}{|P||A|}\right);$$

the rotation axis R is:

$$R = \begin{pmatrix} p_2 a_3 - p_3 a_2 \\ p_3 a_1 - p_1 a_3 \\ p_1 a_2 - p_2 a_1 \end{pmatrix};$$

a unit vector $R_0$ corresponding to the rotation axis R is:

$$R_0 = \begin{pmatrix} r_1 \\ r_2 \\ r_3 \end{pmatrix};$$

a rotation matrix T of the vector P rotating to the standard axis vector A is obtained by the Rodrigues' rotation formula as follows:

$$T = \begin{bmatrix} \cos\varphi + r_1^2(1-\cos\varphi) & r_1 r_2(1-\cos\varphi) - r_3\sin\varphi & r_2\sin\varphi + r_1 r_3(1-\cos\varphi) \\ r_3\sin\varphi + r_1 r_2(1-\cos\varphi) & \cos\varphi + r_2^2(1-\cos\varphi) & -r_1\sin\varphi + r_2 r_3(1-\cos\varphi) \\ -r_2\sin\varphi + r_1 r_3(1-\cos\varphi) & r_1\sin\varphi + r_2 r_3(1-\cos\varphi) & \cos\varphi + r_3^2(1-\cos\varphi) \end{bmatrix};$$

according to a chosen order of Euler angles, corresponding Euler angles are obtained to realize positioning of the axis.

5. The method according to claim 1, wherein, in step 5, at least one redundant point P3 is added for verifying the results of scanning to determine the vector P2P1.

6. The method to claim 1, wherein, in step 7, in a process of the temperature measurement/sampling tool (3) moving to seek out the TCP-point, the laser ranging sensor (6) is used to assist in calibration of the result verified, wherein the reading of the laser ranging sensor (6) is used for detection of reliability of an axial calibration result and deformation of the standard temperature measurement/sampling gun (4).

7. A device for calibrating an elongated metallurgical tool based on at least one laser ranging sensor, comprising a robot (1), a plurality of temperature measurement/sampling tools (3) provided on an end flange plate of the robot (1), temperature measurement/sampling guns (4) connected to the temperature measurement/sampling tools, one or more laser ranging sensors (6), and calibrating devices (7) located outside the laser ranging sensors (6), wherein the device preforms a calibration of the elongated tool using the method according to claim 1.

8. The device according to claim 7, wherein the laser ranging sensor (6) has a digital quantity/analog quantity detection function, and a detection range of the digital quantity/analog quantity of the laser ranging sensor (6) is selected according to a space scale of the temperature measurement/sampling tool (3) and an on-site space scale.

9. The device according to claim 8, wherein a profile of the laser ranging sensor (6) is marked, wherein three surfaces are labeled as surface D, surface E and surface F, and three surfaces opposite to the three surfaces are labeled as surface D-1, surface E-1 and surface F-1, respectively, and wherein the surface F is an emitting/receiving surface of a laser (11); and an arrangement of the laser ranging sensor (6) includes an installation of a single sensor, or an installation of two sensors, wherein the two sensors are arranged side-by-side, side-by-side staggered, orthogonal, or orthogonal staggered.

\* \* \* \* \*